Figure 1:
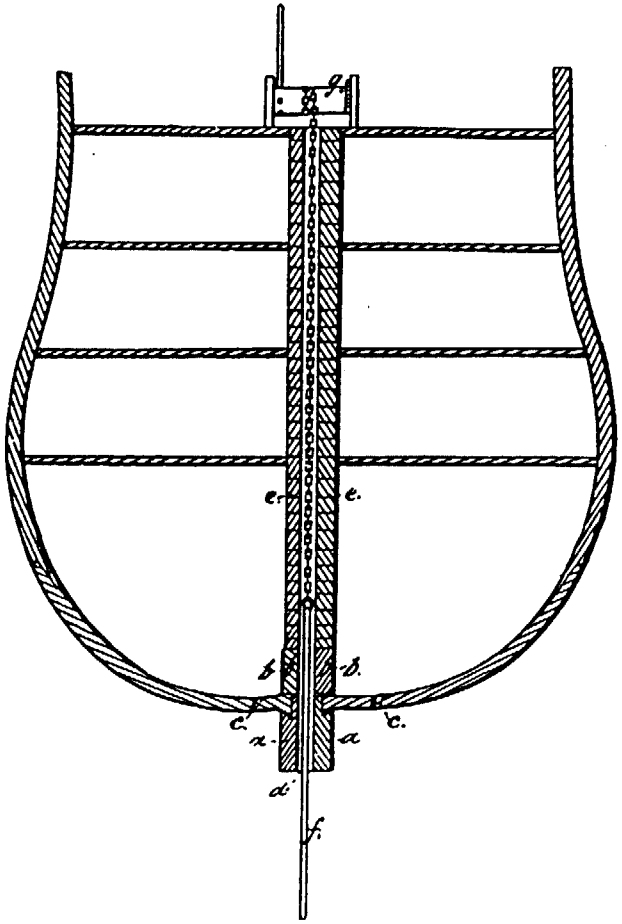
Figure 2:
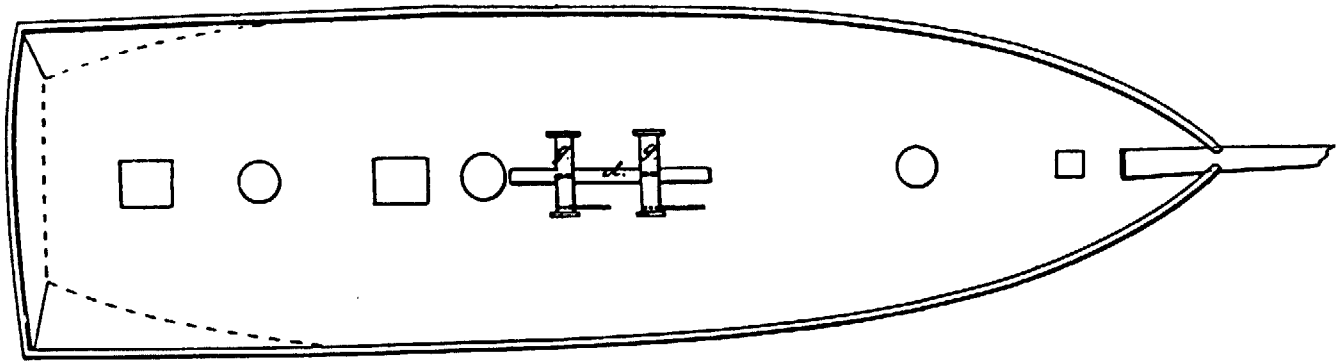

3333½ X

Sheet 1. 3 Sheets.

J. Wiltse.

Centre Board and Keel.

Patented May 4, 1821.

N. PETERS, PHOTO-LITHOGRAPHER, WASHINGTON, D. C.

3333½X

Sheet 2. 3 Sheets.

J. Wiltse.

Centre Board and Keel.

Patented May 4, 1821.

E. PETERS, PHOTO-LITHOGRAPHER, WASHINGTON, D.C.

3333½X
Sheet 3. 3 Sheets.
J. Wiltse.
Centre Board and Keel.
Patented May 4, 1821
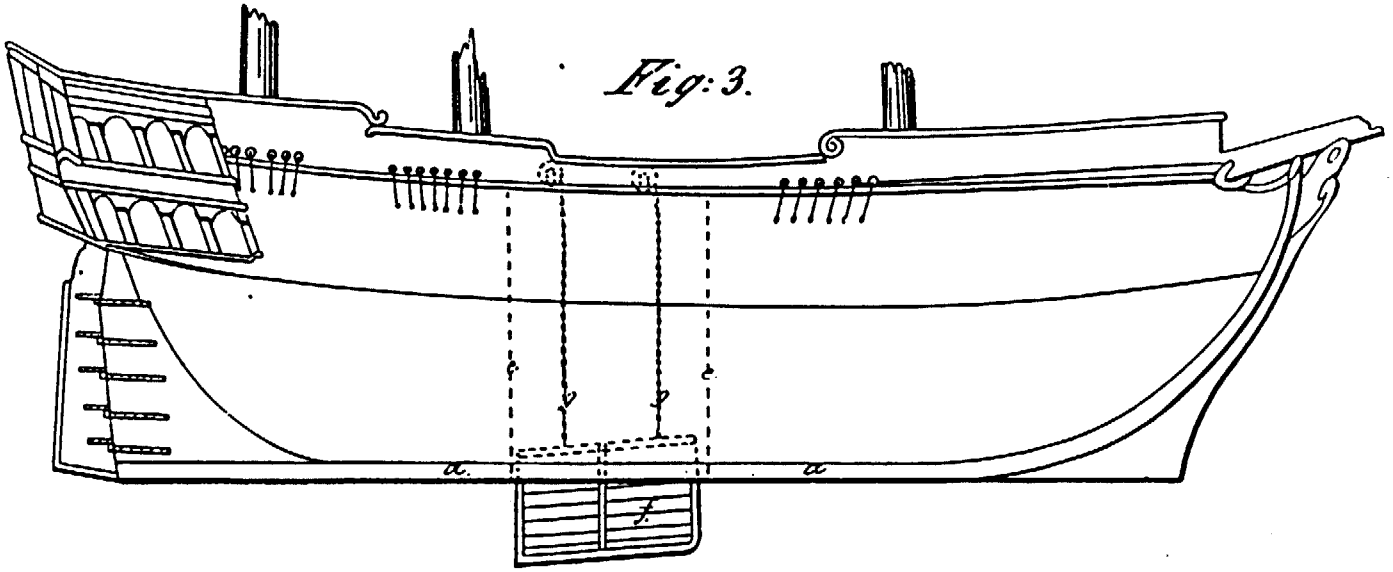
E. MEYER PHOTO-LITHOGRAPHER WASHINGTON, D. C.

TEMPORARY NOTICE of BEST AVAILABLE IMAGE

U. S. PATENT AND TRADEMARK OFFICE

THE SCANNED IMAGES OF PATENT NUMBER 3333 1/2 X FOR THE ISSUE DATE OF

5/4/1821. ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

TEMPORARY NOTICE of BEST AVAILABLE IMAGE